(12) United States Patent
Nakamura et al.

(10) Patent No.: US 12,088,231 B2
(45) Date of Patent: Sep. 10, 2024

(54) MOTOR TEMPERATURE AND TORQUE ESTIMATION DEVICE, AND MOTOR CONTROL DEVICE

(71) Applicant: Mitsubishi Electric Corporation, Tokyo (JP)

(72) Inventors: Yuichiro Nakamura, Tokyo (JP); Yuya Tsuchimoto, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 37 days.

(21) Appl. No.: 17/920,036

(22) PCT Filed: Jun. 5, 2020

(86) PCT No.: PCT/JP2020/022250
§ 371 (c)(1),
(2) Date: Oct. 20, 2022

(87) PCT Pub. No.: WO2021/245904
PCT Pub. Date: Dec. 9, 2021

(65) Prior Publication Data
US 2023/0163715 A1 May 25, 2023

(51) Int. Cl.
*H02P 29/66* (2016.01)
*H02P 21/14* (2016.01)

(52) U.S. Cl.
CPC .......... *H02P 29/662* (2016.11); *H02P 21/141* (2013.01)

(58) Field of Classification Search
CPC .............................. H02P 29/662; H02P 21/141
See application file for complete search history.

(56) References Cited

U.S. PATENT DOCUMENTS 8,791,716 B2 * 7/2014 Tanimoto .................. H02P 5/50
 318/700
2013/0093371 A1 * 4/2013 Akasako ............... H02P 29/662
 318/400.02

(Continued)

FOREIGN PATENT DOCUMENTS

JP 2011-45185 A 3/2011
JP 2013-198340 A 9/2013

OTHER PUBLICATIONS

International Search Report and Written Opinion mailed on Sep. 1, 2020, received for PCT Application PCT/JP2020/022250, filed on Jun. 5, 2020, 8 pages including English Translation.

*Primary Examiner* — Zoheb S Imtiaz
(74) *Attorney, Agent, or Firm* — XSENSUS LLP

(57) ABSTRACT

A motor temperature and torque estimation device comprises: a temperature sensor; a losses estimation circuitry to estimate an iron loss; a first temperature estimation circuitry to estimate a first magnet temperature from the estimated iron loss and a sensor's detected temperature; a second temperature estimation circuitry, to input into a magnet's magnetic flux calculator thereinside motor's modified inductance, to estimate a second magnet temperature from magnet's magnetic flux calculated through voltage equations; a magnet-temperature estimation circuitry to estimate a motor's magnet temperature from the first and second magnet temperatures; a magnet's magnetic estimation circuitry to estimate magnetic flux based on the calculated/modified one, the motor's estimated magnet temperature and temperature characteristics, and to output the estimated magnetic flux into the losses estimator; and a torque estimation circuitry to estimate torque based on the estimated magnetic flux and iron loss, wherein a motor's magnet temperature(s) and torque are estimated.

20 Claims, 9 Drawing Sheets

(56) References Cited

U.S. PATENT DOCUMENTS

2015/0295531 A1\* 10/2015 Kim .................. H02P 23/14
 318/400.22
2018/0109221 A1\* 4/2018 Shin .................. G01K 1/024

\* cited by examiner

MOTOR TEMPERATURE AND TORQUE ESTIMATION DEVICE, AND MOTOR CONTROL DEVICE

CROSS-REFERENCE TO RELATED APPLICATION

The present application is based on PCT filing PCT/JP2020/022250, filed Jun. 5, 2020, the entire contents of which is incorporated herein by reference.

TECHNICAL FIELD

The disclosure of the present application relates to a motor temperature and torque estimation device, and a motor control device.

BACKGROUND ART

Torque of a permanent-magnet motor is approximately proportional to the magnitude of magnetic flux produced by a permanent magnet(s) of a rotor. For this reason, in order to control the torque in a high degree of accuracy, it is better to preliminarily measure magnetic flux of the permanent magnet(s), and to control an electric current(s) on the basis of measured one. However, because magnetic flux of a permanent magnet changes depending on its temperature, there arises a problem in that, when a temperature of a permanent magnet increases at such a time of heavy loading and/or when ambient temperature changes, the accuracy of the torque control is reduced.

For example, as this kind of torque estimation technology, there is a torque estimation technology which has a first permanent magnet's magnetic flux estimation means using a heat or thermal model of a motor, and a second permanent magnet's magnetic flux estimation means using an estimation error calculator of electric machine's constants; and, by controlling an input(s) into an integrator(s) using weighting factors or coefficients for changing over these two estimation means therebetween, the enhancement of torque estimation accuracy is realized, and also, in the estimation of an iron loss of the motor, a model is used which depends only on a rotational speed in its certain range (for example, refer to Patent Document 1).

RELATED ART DOCUMENTS

Patent Documents

[Patent Document 1] Japanese Patent Laid-Open No. 2011-045185
[Patent Document 2] Japanese Patent Laid-Open No. 2013-198340
[Non-Patent Document 1] TAKEDA, et al., "Design and Control of Interior Permanent Magnet Synchronous Motor (First Edition)," December, H23 (2011), Pages 76 and 86, Ohmsha, Ltd., Tokyo
[Non-Patent Document 2] MORIMOTO, et al., "Principles of Energy-Conserving Motor and Design Method (First Edition)," July, 2013, Page 179, Kagaku Gijutsu Shuppan Inc., Tokyo

SUMMARY OF THE INVENTION

Problems to be Solved by the Invention

However, in a control device which estimates a magnet temperature by means of such a loss estimation model and such a temperature estimation model, an estimation accuracy of losses is degraded when an energizing current is large at such a time of heavy loading or when a rotational speed is high at such a time of the highest rotational speed, and, as a result, a temperature estimation accuracy is degraded, so that there arises a problem in that motor's torque cannot be accurately estimated.

The present disclosure in the application concerned has been directed at disclosing technologies for solving those problems as described above, an object of the disclosure is to provide a motor temperature and torque estimation device in which, by estimating an iron loss on the basis of magnet's magnetic flux corrected or modified in accordance with a magnet temperature or with voltage equations, an estimation accuracy of losses in a motor is enhanced, and an estimation accuracy of the magnet temperature and that of torque are increased.

Means for Solving the Problems

A motor temperature and torque estimation device disclosed in the disclosure of the application concerned is a motor temperature and torque estimation device which comprises:
 a temperature sensor for detecting a temperature of an object to be measured;
 a losses estimation unit including an iron loss estimator, a mechanical loss estimator and a copper loss estimator for estimating an iron loss, a mechanical loss and a copper loss being respective losses of a motor, for estimating the iron loss, the mechanical loss and the copper loss, and outputting these losses each being estimated, when an electric current of the motor is energized;
 a first temperature estimation unit into which an output of the temperature sensor and outputs of the losses estimation unit are inputted, for estimating a first magnet temperature of the motor from losses of the motor estimated by the losses estimation unit and from a detection temperature of the object to be measured being detected by the temperature sensor, and for outputting a first magnet temperature of the motor being estimated;
 a second temperature estimation unit including a magnet's magnetic flux calculator thereinside for calculating magnet's magnetic flux of the motor on the basis of an energizing current of the motor, on that of an armature voltage thereof, on that of a coil resistance thereof and on that of inductance of the motor estimated in accordance with the energizing current, for estimating a second magnet temperature of the motor on the basis of magnet's magnetic flux of the motor obtained through a calculation and on that of magnet's magnetic flux estimated in accordance with the energizing current, and for outputting a second magnet temperature of the motor being estimated;
 a magnet-temperature estimation unit for estimating a magnet temperature of the motor from an output of the first temperature estimation unit and from an output of the second temperature estimation unit, and for outputting a magnet temperature of the motor being estimated;
 a magnet's magnetic flux estimation unit for estimating magnet's magnetic flux of the motor on the basis of magnet's magnetic flux estimated by the second temperature estimation unit in accordance with the energizing current, on that of a magnet temperature estimated by the magnet-temperature estimation unit and on that of a magnet's temperature characteristic(s), and also for outputting magnet's magnetic flux being estimated into the iron loss estimator; and a torque estimation unit into which an output of the magnet's magnetic flux estimation unit and outputs of the losses estimation unit are inputted, for estimating torque of the motor on the basis of magnet's magnetic flux estimated by the magnet's magnetic flux estimation unit, on that of the iron loss being estimated and on that of the mechanical loss being estimated, wherein a magnet temperature (s) of the motor and torque of the motor are estimated.

Effects of the Invention

According to the motor temperature and torque estimation device disclosed in the disclosure of the application concerned, an iron loss is estimated on the basis of magnet's magnetic flux corrected or modified in accordance with a magnet temperature or with voltage equations, whereby it becomes possible to provide a motor temperature and torque estimation device in which an estimation accuracy of losses in a motor is enhanced and an estimation accuracy of a magnet temperature and that of torque are increased.

EMBODIMENTS FOR CARRYING OUT THE INVENTION

Figure 1:
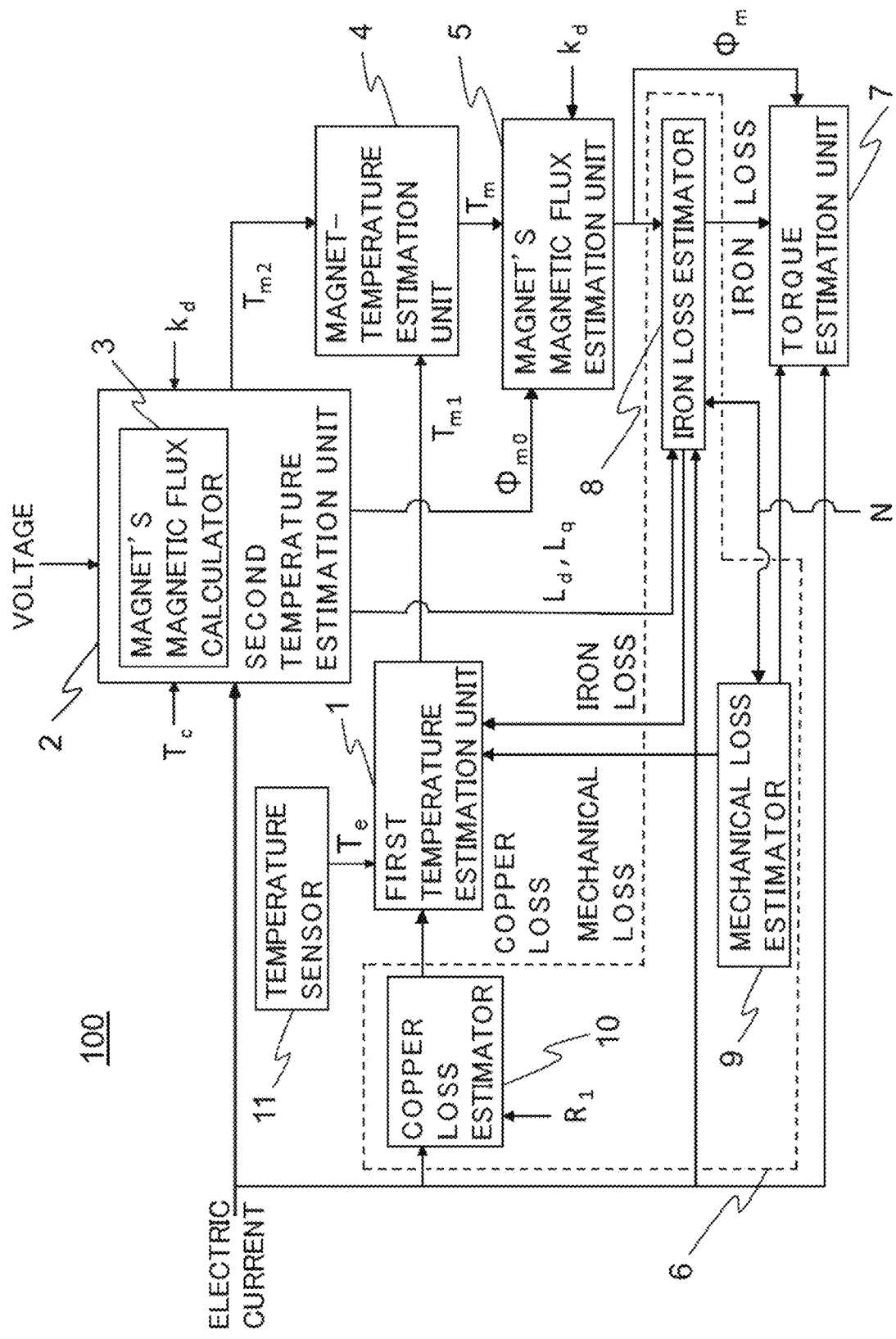
FIG. 1 is a block diagram illustrating a configuration of a motor temperature and torque estimation device according to Embodiment 1.

The disclosure of the present application relates to motor temperature and torque estimation devices in each of which, during the operations of a motor, its magnet temperature and torque are estimated on the basis of magnet temperatures being estimated by means of a plurality of magnet's temperature estimation units and on the basis of losses being estimated thereby. Hereinafter, the explanation will be made referring to the drawings for the embodiments of the present disclosure in the application concerned. Note that, the disclosure of the application concerned is not limited to those embodiments described below.

Embodiment 1

FIG. 1 is a block diagram illustrating a configuration of a motor temperature and torque estimation device 100 according to Embodiment 1. In the figure, a magnet temperature(s) is estimated on the basis of losses of a motor; and also, a first temperature estimation unit 1 for compensating or correcting a magnet temperature being estimated by means of a detection temperature detected by a temperature sensor 11 for detecting a temperature of an object to be measured (for example, a coil, an angle detector and the like) mounted on the motor temperature and torque estimation device, and a second temperature estimation unit 2, including a magnet's magnetic flux calculator 3 thereinside for calculating magnet's magnetic flux of the motor in accordance with an electric current energizing through the motor, for estimating a magnet temperature on the basis of magnet's magnetic flux calculated by the magnet's magnetic flux calculator 3 are provided, whereby a magnet temperature $T_m$ of the motor is acquired by a magnet-temperature estimation unit 4 from a first magnet temperature $T_{m1}$ of the motor and a second magnet temperature $T_{m2}$ of the motor obtained by these temperature estimation units, respectively.

And then, the magnet temperature $T_m$ having been estimated by means of the plurality of temperature estimation units and a magnet's temperature coefficient $k_d$ are inputted into a magnet's magnetic flux estimation unit 5 for estimating magnet's magnetic flux with consideration given to its temperature characteristics, so that magnet's magnetic flux is acquired at the magnet temperature having been estimated; and torque of a motor is estimated by a torque estimation unit 7, on the basis of the magnet's magnetic flux having been acquired and on that of losses of the motor having been estimated by means of a losses estimation unit 6. That is to say, in the motor temperature and torque estimation device 100 according to Embodiment 1, it is so arranged that, with consideration given to thermal demagnetization in which magnet's residual magnetic flux density is reduced due to the increase of a magnet temperature and with consideration given to "lost torque" caused by an iron loss and a mechanical loss, torque in which the amount of "lost torque" is modified is calculated by the torque estimation unit 7.

By the way, as for the losses of a motor described above, there exist an iron loss caused because of changes of magnetic field within an iron core(s), a mechanical loss caused by friction losses of bearings and a windage loss of a cooling fan(s), a copper loss which is caused when an electric current flows through an electrically conductive wire(s) having resistance, and so forth. Therefore, in a motor temperature and torque estimation device, it is necessary to evaluate and estimate those losses of a motor described above in good degrees of accuracy, in order to increase a torque estimation accuracy.

For dealing therewith, in order to estimate how the aforementioned motor's losses change when an electric current flows through the motor, it is so arranged that, in the motor temperature and torque estimation device 100 according to Embodiment 1, estimators relating to three kinds of losses, i.e., an iron loss estimator 8, a mechanical loss estimator 9 and a copper loss estimator 10 are provided in every one of the losses described above.

As described above, by using the plurality of magnet's temperature estimation units, it becomes possible to estimate a magnet temperature in a high degree of accuracy in a whole category of operation patterns; and, because demagnetization resistance becomes higher when the magnet temperature is lower, a motor having higher torque can be achieved while increasing its energizing current.

Figure 2:
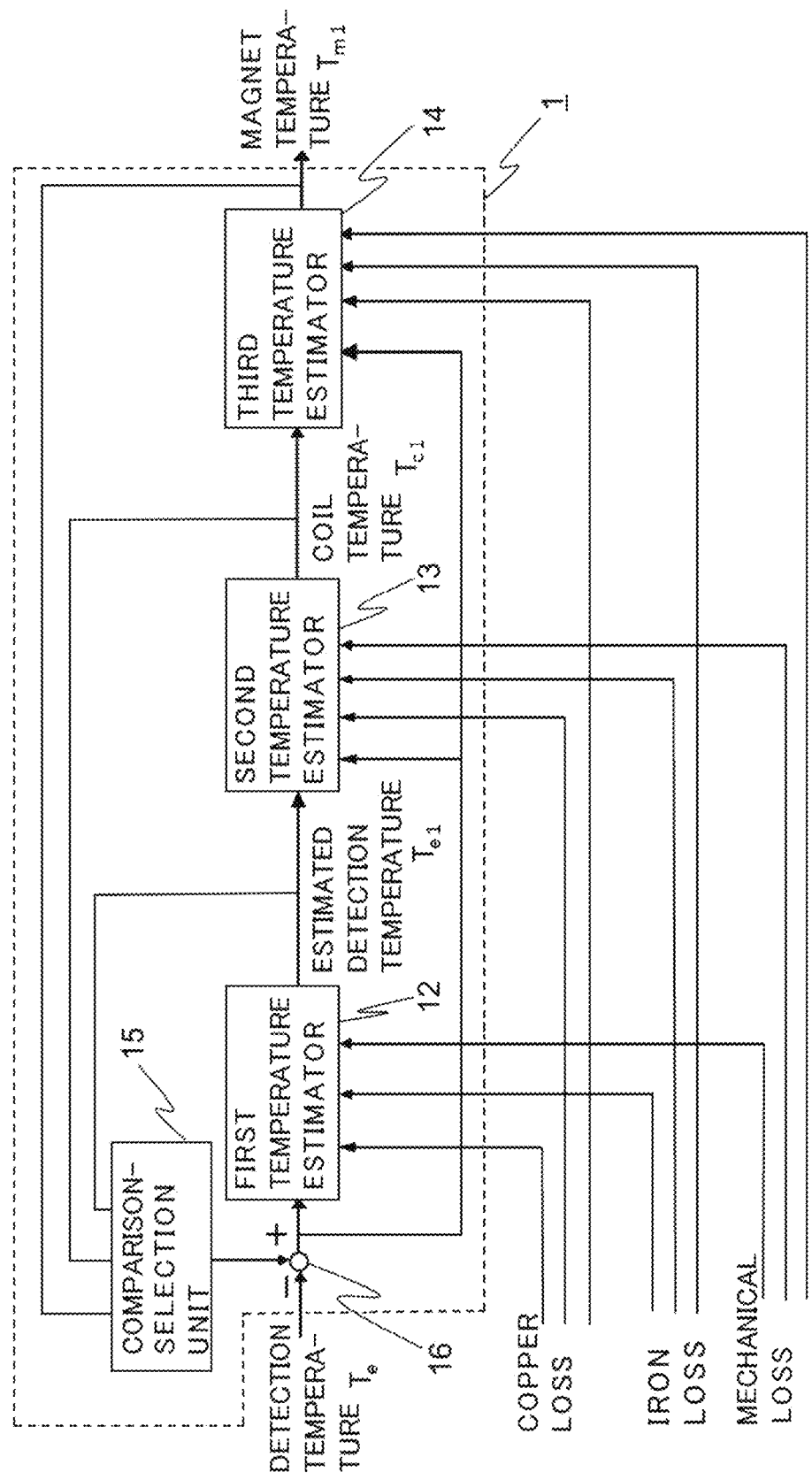
FIG. 2 is a block diagram of a first temperature estimation unit in the motor temperature and torque estimation device according to Embodiment 1.

FIG. 2 is a block diagram of the first temperature estimation unit in the motor temperature and torque estimation device according to Embodiment 1. Here, the first temperature estimation unit 1 includes a first temperature estimator 12 constituted of thermal resistance and thermal capacity which are thermophysical property values for simulating each constituent element of a motor, a second temperature estimator 13 constituted thereof and a third temperature estimator 14 constituted thereof, and estimates a first magnet temperature $T_{m1}$ by individually inputting a copper loss, an iron loss and a mechanical loss, being losses of a motor each of which is estimated by the losses estimation unit 6, into these three kinds of temperature estimators differing in their properties from each other.

By means of these three kinds of temperature estimators, it becomes possible to estimate an estimated detection temperature $T_{e1}$, a first coil temperature $T_{c1}$ and the first magnet temperature $T_{m1}$. In addition to this, by including an angle detector having a temperature sensor, a thermophysical property value being a parameter of at least one temperature estimator among those from the first temperature estimator 12 to the third temperature estimator 14 described above is updated so that the quantity of difference between a detection temperature $T_e$ detected by the temperature sensor of the angle detector and a temperature being estimated (for example, the difference "$T_{e1}-T_e$" between an estimated detection temperature Te1 being an output of the first temperature estimator 12 and a detection temperature $T_e$) becomes smaller, whereby it is made possible to estimate the magnet temperature in a high degree of accuracy.

In order to achieve the description stated above, it is suitable to arrange that, for example, a turn-on/turn-off switch is placed on an input side of the first temperature estimator 12 for every one of the temperature estimators described above, on the partway of a route where a respective output of the temperature estimators from the first temperature estimator 12 to the third temperature estimator 14 is individually branching for the return.

In FIG. 2, outputs of the three kinds of respective temperature estimators described above are interconnected with a comparison-selection unit 15. At this occasion, the explanation will be made for a case in which, for example, any two signals among these three kinds of output signals are selected by a comparison-selection unit. To be specific, a case is presumed in which, in the comparison-selection unit 15, three turn-on/turnoff switches (not shown in the figure) connected to the outputs of the three kinds of respective temperature estimators described above are built in, and the explanation will be made for a case in which, first, any two signals among the three kinds of output signals described above are selected by the comparison-selection unit. In this case, among the three turn-on/turn-off switches described above, two turn-on/turn-off switches corresponding to two signals to be selected are set being turned on. And then, next, between estimation signals outputted from two temperature estimators having been selected, an estimation signal whose difference to a detection temperature Te is the smallest is selected by the comparison-selection unit 15, and is transmitted to an input-side terminal 16 of the first temperature estimator 12 as an output of the comparison-selection unit 15. From that time onward, in any case of a signal to be selected, a thermophysical property value(s) being a parameter(s) of each temperature estimator is updated so that the quantity of difference to the detection temperature becomes smaller. Note that, in updating the parameter(s) of each temperature estimator, thermophysical property values such as thermal resistance, thermal capacity and the like which simulate each constituent element of a motor are corrected or modified on demand basis of updating.

Figure 3:
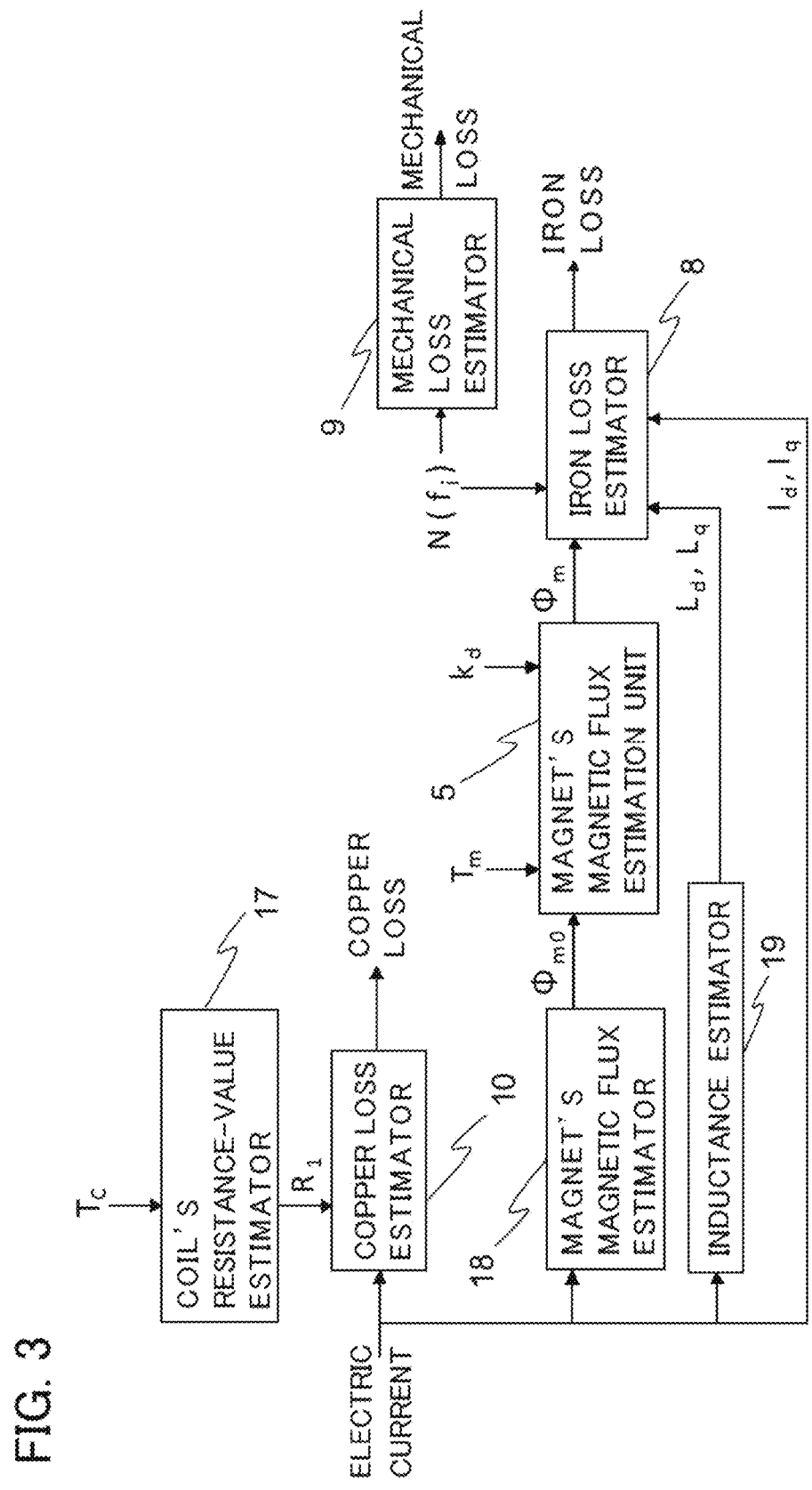
FIG. 3 is a block diagram of a losses estimation unit in the motor temperature and torque estimation device according to Embodiment 1.

FIG. 3 is a block diagram illustrating the details of the losses estimation unit according to Embodiment 1. Losses of a motor are mainly made of a copper loss, an iron loss and a mechanical loss. Here, a copper loss can be given from a resistance value and an electric current. An iron loss is caused because of changes of magnetic field within an iron core(s), and is dependent on magnetic flux density and on an electric current's frequency. In addition, a mechanical loss is constituted of friction losses of bearings, a windage loss of a cooling fan(s) and so forth, and is dependent on a rotational speed of a motor. For dealing therewith, the explanation will be hereinafter made specifically referring to the figures for a loss estimation device which projects the estimation of these losses.

First, a copper loss is calculated by means of the copper loss estimator 10 from an energizing current through into a motor and from a coil's resistance value $R_1$. Here, a coil's resistance value $R_1$ is corrected or modified by a coil temperature $T_c$ which is an input into a coil's resistance-value estimator 17. And then, the copper loss is estimated as an output of the copper loss estimator 10 on the basis of the energizing current inputted into the copper loss estimator 10 and on that of the coil's resistance value $R_1$ inputted thereinto.

Next, an iron loss is estimated in accordance with the variation of magnet's magnetic flux $\phi_m$, with inductance ($L_d$, $L_q$), and with the variation of armature's magnetic flux calculated from an energizing current ($i_d$, $i_q$). To be specific, magnet's magnetic flux $\phi_{m0}$ being an output from a magnet's magnetic flux estimator 18 into which an energizing current is inputted is thus inputted into the magnet's magnetic flux estimation unit 5, and so, the magnet's magnetic flux $\phi_m$ is acquired as an output of the magnet's magnetic flux estimation unit 5 on the basis of a magnet temperature $T_m$ which has been estimated by the magnet-temperature estimation unit 4 and which is inputted into the magnet's magnetic flux estimation unit 5 at the same time, and on that of a magnet's temperature coefficient $k_d$. In addition, the inductance ($L_d$, $L_q$) is acquired as outputs of an inductance estimator 19 into which the energizing current is inputted. And then, an estimated iron loss is acquired as an output of the iron loss estimator 8 on the basis of the magnet's magnetic flux $\phi_m$ having been acquired, on that of the inductance ($L_d$, $L_q$) having been acquired, on that of the energizing current ($i_d$, $i_q$) and on that of a motor's rotational speed N, which are inputted into the iron loss estimator 8. Note that, in the figure, parameter "$f_i$" designates an electric current's frequency; and so, the estimated iron loss can be acquired by inputting into the iron loss estimator the electric current's frequency $f_i$, in place of a rotational speed N of the aforementioned motor.

According to the losses estimation unit described above, an iron loss can be estimated in a high degree of accuracy, when the energizing current is large at such a time of heavy loading, or even when a rotational speed is high at such a time of the highest rotational speed.

Hereinafter, magnet's magnetic flux $\phi_m$ is corrected or modified in accordance with an energizing current and with a magnet temperature $T_m$; and so, the explanation will be made in more detail for calculation schemes of the "$\phi_m$". Here, at a time when magnet's magnetic flux is corrected or modified in accordance with an energizing current, a result of magnet's magnetic flux (magnet's magnetic flux $\phi_{m0}(i_d, i_q)$) measured in advance at a known temperature $T_0$ on an every electric current is utilized, or a theoretical expression(s) (hereinafter, referred to as "an evaluation expression(s) derived from a theory") (for example, refer to Non-Patent Document 1, which is applicable hereinafter in a similar fashion) or a magnet's magnetic flux model (for example, refer to Non-Patent Document 1; hereinafter in a similar fashion) formed by means of an electromagnetic analysis is utilized.

At a time when magnet's magnetic flux is corrected or modified in accordance with a magnet temperature, used is a result in which the quantity of thermal demagnetization due to the increase of magnet temperature is measured, or a magnet's temperature coefficient $k_d$ prepared based on catalog values of commercially available products. Magnet's magnetic flux corrected or modified in accordance with an energizing current and a magnet temperature is given by next Expression (1).

[Expression Figure-1]

$$\phi_m = \{1 - k_d(T_m - T_0)\}\phi_{m0}(i_d, i_q) \quad (1)$$

The inductance is corrected or modified in accordance with an energizing current. At a time when the inductance is corrected or modified in accordance with an energizing current, a result of the inductance measured in advance on an every electric current is utilized, or an evaluation expression(s) derived from a theory or an inductance model "$L_{dm}(i_d, i_q), L_{qm}(i_d, i_q)$" formed by means of an electromagnetic analysis is utilized (for example, refer to Non-Patent Document 1; hereinafter in a similar fashion).

It should be noted that a mechanical loss is calculated by means of the mechanical loss estimator 9 on the basis of a rotational speed N of a motor, or on that of an electric current's frequency $f_i$ (refer to FIG. 3). Note that, by storing the information in which losses of a motor are estimated at the time of motor's operations in high degrees of accuracy according to the schemes described above, it becomes possible to perform failure or malfunction diagnosis by comparing a loss value(s) at a time of the operations with that at the time of the operations in the past.

Figure 4:
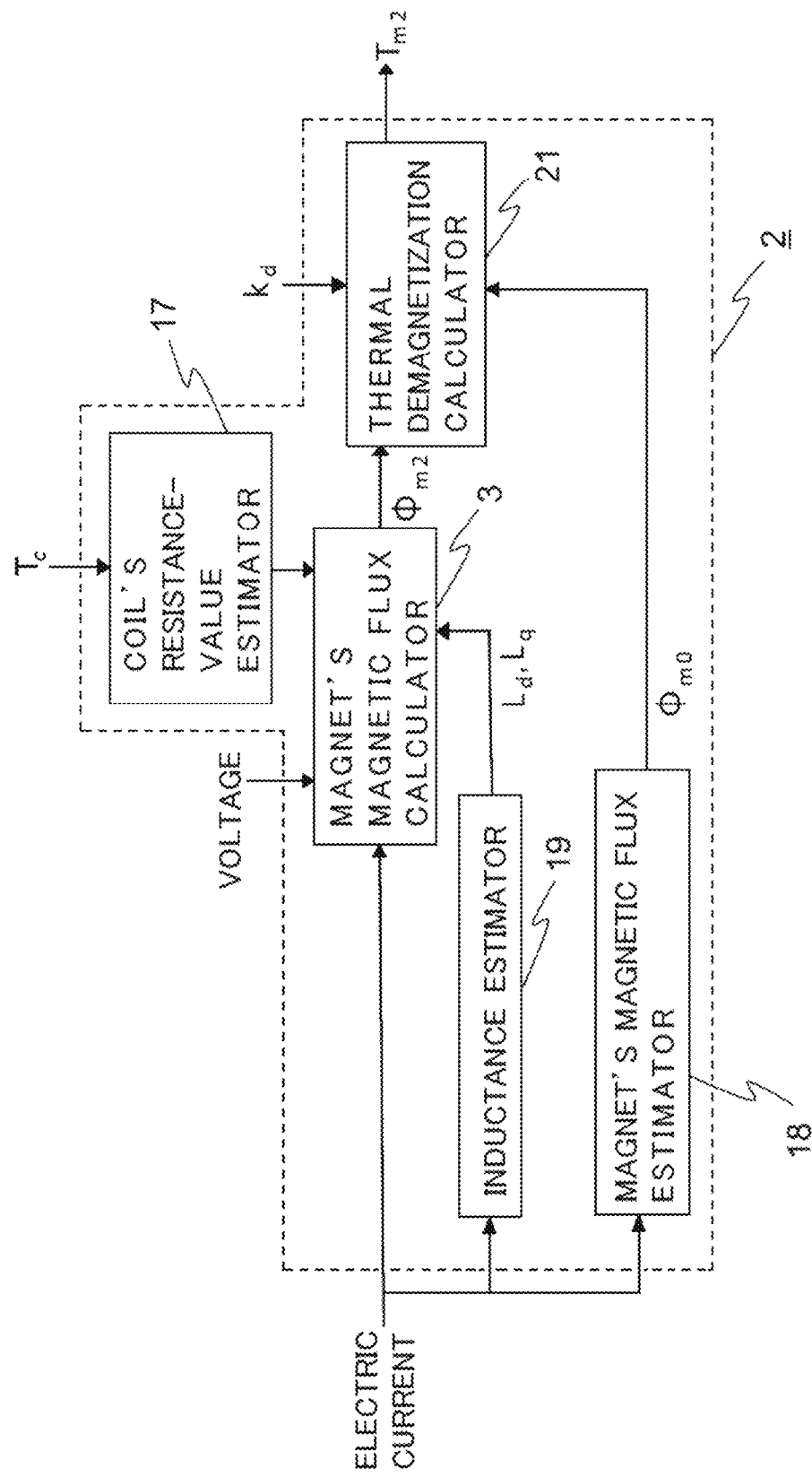
FIG. 4 is a block diagram of a second temperature estimation unit in the motor temperature and torque estimation device according to Embodiment 1.

FIG. 4 is a block diagram for explaining a second temperature estimation unit in the motor temperature and torque estimation device according to Embodiment 1. In relation to the ratio between magnet's magnetic flux $\phi_{m2}$ being calculated by means of the magnet's magnetic flux calculator 3 for acquiring magnet's magnetic flux by utilizing voltage equations (here, in regard to the voltage equations, refer to, for example, Expression (3) of Patent Document 2, which is applicable hereinafter in a similar fashion; note that, in order to acquire a magnet's magnetic flux by utilizing voltage equations, a coil's resistance value and an estimated motor's inductance are inputted into the magnet's magnetic flux calculator 3, other than an energizing current and an armature voltage) on the basis of an energizing current measured under a motor operation and on that of an armature voltage measured thereunder and magnet's magnetic flux $\phi_{ma}(i_d, i_q)$ being corrected or modified in accordance with the energizing current, a second magnet temperature $T_{m2}$ is estimated with respect to a known temperature $T_0$ by means of a thermal demagnetization calculator 21 by further reflecting an effect of thermal demagnetization to be incorporated. Note that, other than for the constituent components explained as described above, the detailed explanation will be omitted hereinafter, because the explanation has already been made for those constituent components of the second temperature estimation unit shown in FIG. 4 in the explanation for the losses estimation unit of FIG. 3.

An evaluation expression for estimating a second magnet temperature $T_{m2}$ in this case is given by next Expression (2).

[Expression Figure-2]

$$T_{m2} = T_o + \frac{1}{k_d}\left(1 - \frac{\phi_{m2}}{\phi_{ma}(i_d, i_q)}\right) \quad (2)$$

At a time when the "$\phi_{m2}$" in Expression (2) is acquired, specifically inputted in detail is "$L_{da}(i_d, i_q), L_{qa}(i_d, i_q)$" being a motor's inductance which is corrected or modified in accordance with the energizing current described above.

At a time when the inductance used for voltage equations is corrected or modified in accordance with an energizing current, a measurement result of the inductance measured in advance on an every electric current is utilized similarly at the time of an iron loss calculation, or an evaluation expression(s) derived from a theory or a map "$L_{dp}(i_d, i_q), L_{qp}(i_d, i_q)$" (for example, refer to Non-Patent Document 2, which is applicable hereinafter in a similar fashion) formed by means of an electromagnetic analysis is utilized. Note that, a coil's resistance value in use for the voltage equations is corrected or modified by an estimated coil temperature $T_c$.

At a time when magnet's magnetic flux is corrected or modified in accordance with an energizing current, a result of the magnet's magnetic flux measured in advance at a known temperature on an every electric current is utilized similarly at the time of an iron loss calculation, or an evaluation expression(s) derived from a theory or a map "$\phi_{m0p}(i_d, i_q)$" formed by means of an electromagnetic analysis is utilized.

Because the motor temperature and torque estimation device according to Embodiment 1 is constituted as described above, an iron loss is estimated on the basis of magnet's magnetic flux corrected or modified in accordance with a magnet temperature or with voltage equations, whereby it becomes possible to enhance a loss estimation accuracy and to increase an estimation accuracy of a magnet temperature and that of torque.

Embodiment 2

Figure 5:
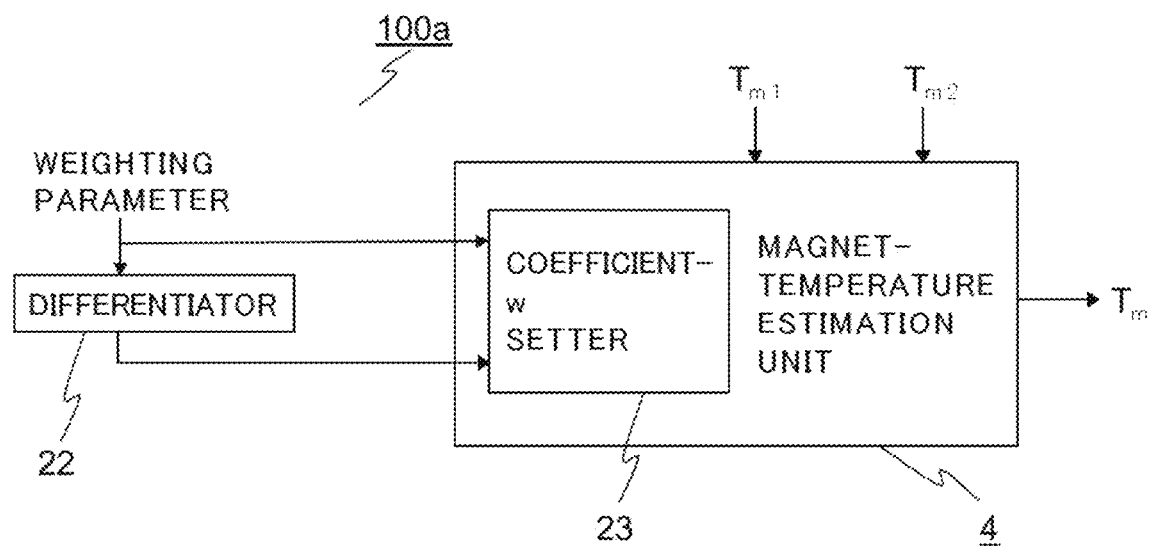
FIG. 5 is a block diagram illustrating a configuration of a magnet-temperature estimation unit in a motor temperature and torque estimation device according to Embodiment 2.

FIG. 5 is a block diagram illustrating a configuration of the magnet-temperature estimation unit 4 in a motor temperature and torque estimation device 100a according to Embodiment 2. A magnet temperature $T_m$ is estimated by using a weighting factor or coefficient w in relation to a first magnet temperature $T_{m1}$ estimated by means of the first temperature estimation unit 1 in which a magnet temperature is estimated on the basis of losses and in which a thermal or temperature estimation model(s) is corrected or modified by a temperature having been detected by a temperature sensor placed in an angle detector, and in relation to a second magnet temperature $T_{m2}$ estimated by means of the second temperature estimation unit 2 on the basis of magnet's magnetic flux of a motor obtained by calculating it by the aforementioned magnet's magnetic flux calculator and on that of magnet's magnetic flux estimated in accordance with an energizing current. A computational expression for estimating the magnet temperature $T_m$ is given by next Expression (3).

[Expression Figure-3]

$$T_m = wT_{m1} + (1-w)T_{m2} \quad (3)$$

Here, the weighting coefficient w is determined in accordance with at least one weighting variable or parameter in the total of twelve weighting variables or parameters among an estimation error of a magnet temperature (for example, $T_{m1}-T_e$), an estimation error of a coil temperature (for example, $T_{c1}-T_e$), an estimation error of an estimated detection temperature (for example, $T_{e1}-T_e$), an energizing current of a motor, a voltage thereof and a rotational speed thereof, and also the rates of change in relation to these six kinds of variables or parameters. Note that, these rates of change are acquired by a differentiator 22. In this case, the coefficient w is set so that it satisfies "0≤w≤1." The setting is performed by means of a coefficient-w setter 23.

Because the motor temperature and torque estimation device according to Embodiment 2 is constituted as described above, it becomes possible to further increase an estimation accuracy of a magnet temperature and that of torque.

Embodiment 3

Figure 6:
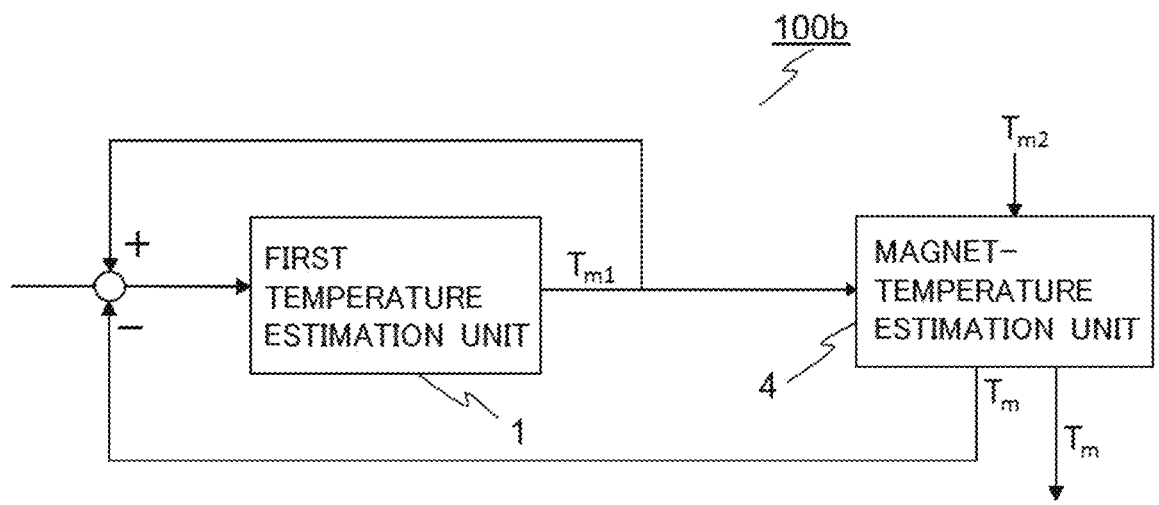
FIG. 6 is a block diagram of a first temperature estimation unit in a motor temperature and torque estimation device according to Embodiment 3.

FIG. 6 is a block diagram illustrating the details of the first temperature estimation unit 1 and those of the magnet-temperature estimation unit 4 in a motor temperature and torque estimation device 100b according to Embodiment 3. Differing from the case in Embodiment 1, an output (feedback signal) "$T_m$" of the magnet-temperature estimation unit 4 is inputted from the magnet-temperature estimation unit through into the first temperature estimation unit 1 (differing from the case in Embodiment 1, the feedback signal is additionally provided), and a thermophysical property value (s) being a parameter (s) in a thermal or temperature model (s) of the first temperature estimation unit 1 is updated (modified) so that a magnet temperature's estimation error "$T_{m1}-T_m$" becomes smaller. In updating the temperature model herein, thermal resistance and thermal capacity are corrected. In addition, the correction of the thermophysical property value (s) described above is performed so that the magnet temperature's estimation error becomes smaller to a further extent in each of the estimation.

Because the motor temperature and torque estimation device according to Embodiment 3 is constituted as described above, it becomes possible to further increase an estimation accuracy of a magnet's temperature and that of torque.

Embodiment 4

Figure 7:
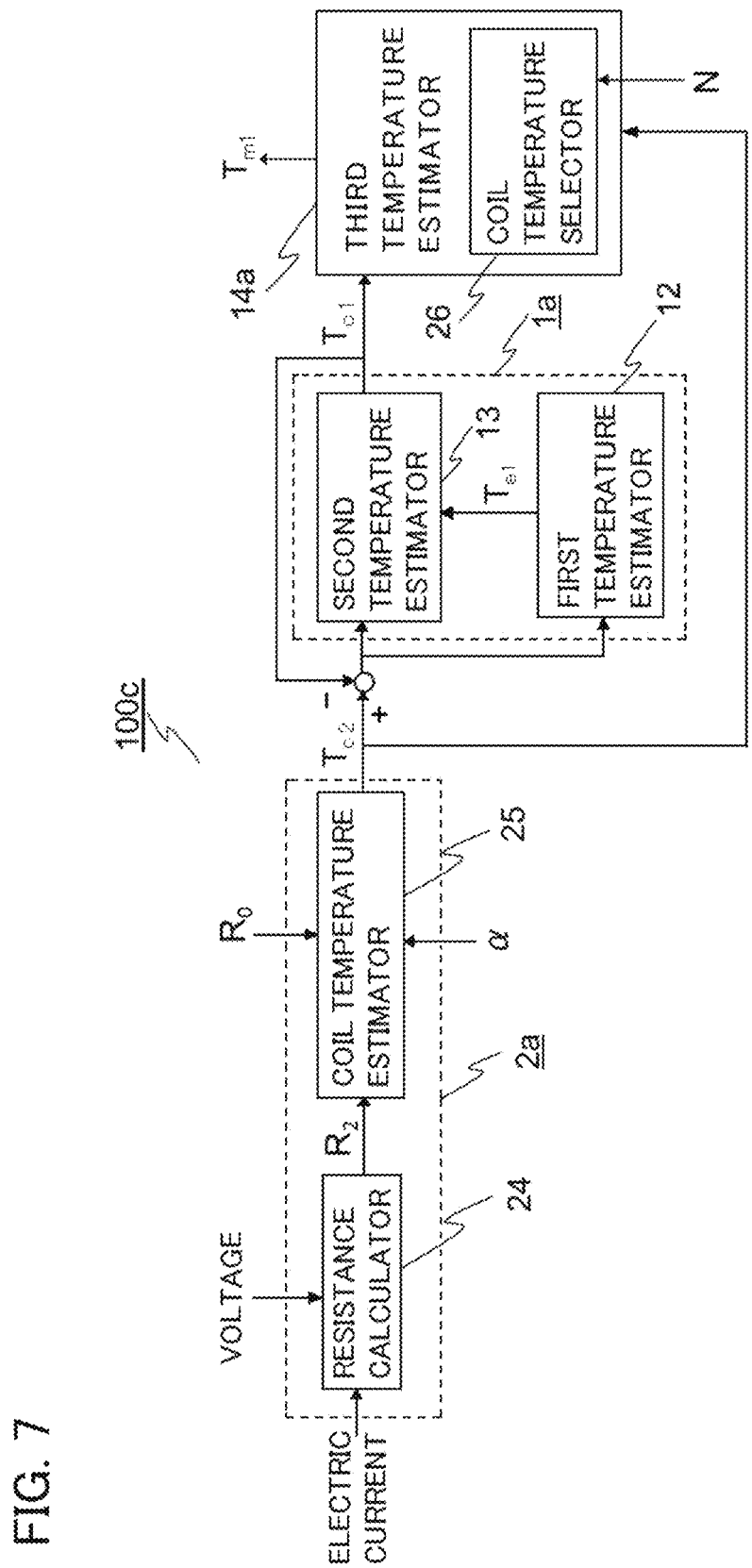
FIG. 7 is a block diagram of a second coil temperature estimation unit in a motor temperature and torque estimation device according to Embodiment 4.

FIG. 7 is a block diagram of coil temperature estimation units in a motor temperature and torque estimation device 100c according to Embodiment 4. Main constituent elements of these coil temperature estimation units are a first coil temperature estimation unit 1a and a second coil temperature estimation unit 2a. Between these, the former is approximately equivalent or similar to that in Embodiment 1, other than another third temperature estimator 14a to be explained below.

For dealing therewith, herein, the explanation will be made first for the second coil temperature estimation unit 2a of the latter. In FIG. 7, a coil's resistance value $R_2$ calculated by means of a resistance calculator 24 for acquiring a coil resistance from an energizing current measured under a motor operation at a rotational speed not more than a rotational speed $N_0$ being set in advance and from an armature voltage measured thereunder by utilizing voltage equations is compared with a coil's resistance value $R_0$ of a result measured in advance at a known temperature $T_0$ or with a coil's resistance value of an evaluation expression (s) derived from a theory, so that a second coil temperature $T_{c2}$ is estimated by using a coil's resistance-value temperature coefficient α (/° C.). An evaluation expression of the coil temperature being set by means of a coil temperature estimator 25 for estimating the second coil temperature $T_{c2}$ is given by next Expression (4).

[Expression Figure-4]

$$T_{c2} = \left(\frac{1}{\alpha} + T_0\right)\frac{R_2}{R_0} - \frac{1}{\alpha} \quad (4)$$

And then, next, in accordance with the magnitude of a motor's rotational speed N inputted into a coil temperature selector 26 of the third temperature estimator 14a, the coil temperature selector 26 selects as an accurate estimation value a first coil temperature $T_{c1}$ having been estimated by means of the first coil temperature estimation unit 1a, when a rotational speed N is higher than "$N_0$." When the operations are performed at the rotational speed which is at "$N_0$" or less, the coil temperature selector 26 selects as an accurate value a second coil temperature $T_{c2}$ having been estimated by means of the second coil temperature estimation unit 2a (as for the manner stated above, refer to Expression (5) described below). On this occasion, parameters provided with the first temperature estimator 12 and/or the second temperature estimator 13 are simultaneously updated so that the quantity of difference "$T_{c2}-T_{c1}$" with respect to a first coil temperature $T_{c1}$ estimated by the first coil temperature estimation unit becomes smaller; and also, a first magnet temperature $T_{m1}$ is estimated by the third temperature estimator 14a.

[Expression Figure-5]

$$T_c = T_{c1} \quad (N > N_0)$$
$$T_c = T_{c2} \quad (N \leq N_0) \quad (5)$$

In addition, in updating parameters of the temperature estimators, values of thermal resistance and thermal capacity on each constituent element of a motor are compensated or corrected. Note that, the first coil temperature estimation unit 1a is one portion of the first temperature estimation unit 1. In other words, in the first temperature estimation unit, included are two kinds of temperature estimation units of a temperature estimation unit on a magnet(s), and of temperature estimation units on a coil(s).

As described above, by estimating a coil temperature by means of the plurality of coil temperature estimation units, an estimation accuracy of the coil temperature is enhanced, so that the coil protection at a time of motor's overload operations can be suitably carried out.

Because the motor temperature and torque estimation device according to Embodiment 4 is constituted as described above, it becomes possible to further enhance an estimation accuracy of a coil temperature.

Embodiment 5

Figure 8:
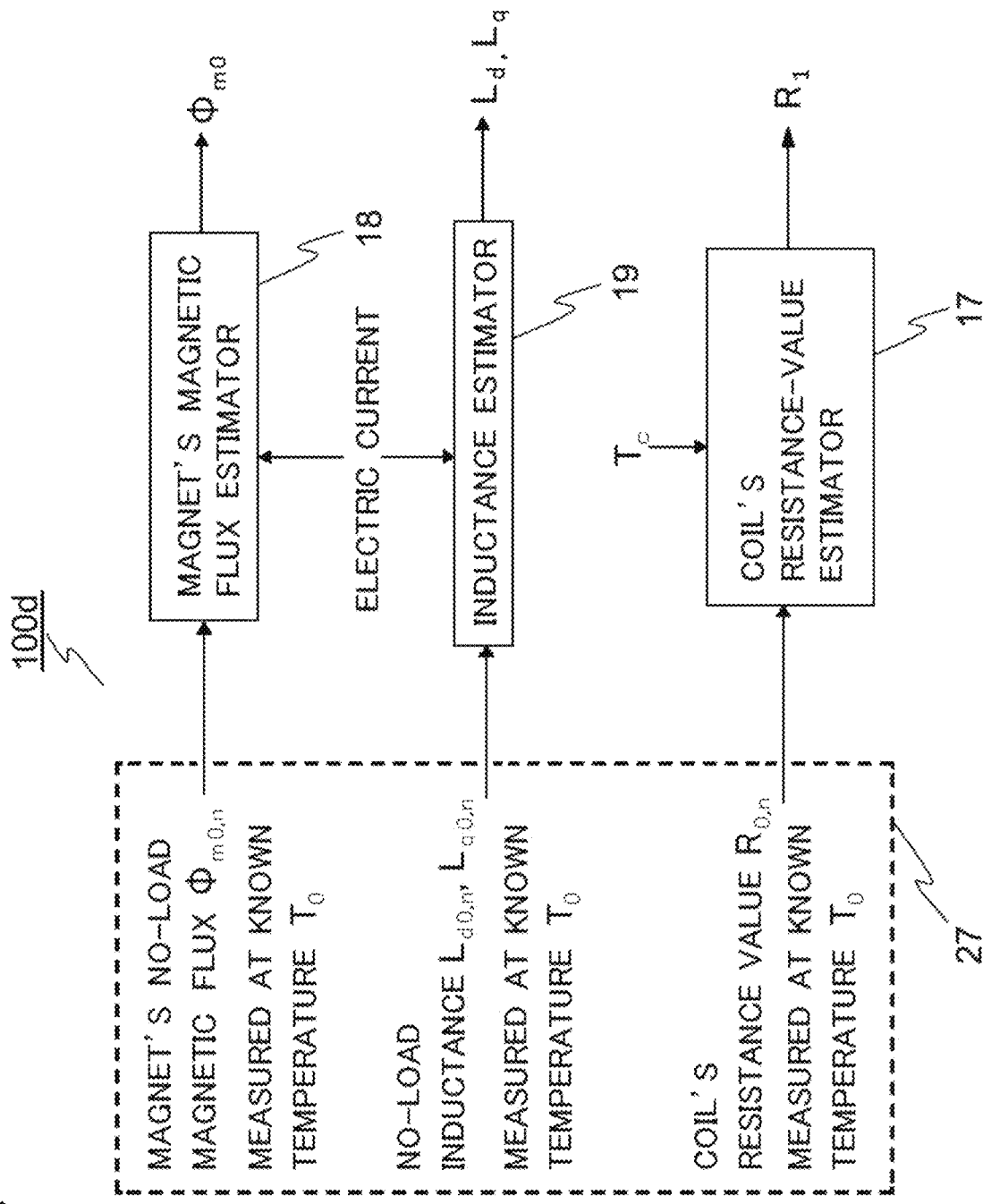
FIG. 8 is a model diagram of a memory unit in a motor temperature and torque estimation device according to Embodiment 5.

Embodiment 5 is for a motor temperature and torque estimation device 100d to achieve a torque estimation device(s) which is commonly applicable to a large number of motors. In FIG. 8, shown is a conceptual model of the motor temperature and torque estimation device according to Embodiment 5. In the figure, a memory unit 27 therein is placed within an angle detector, for example. In every one of a large number of motors, magnet's no-load magnetic flux $\phi_{m0,n}$, no-load inductance ($L_{d0,n}$, $L_{q0,n}$), and a coil's resistance value $R_{0,n}$ each of which is measured in advance at a known temperature $T_0$ are stored in the memory unit 27, and respective parameters (thermophysical property values) of the magnet's magnetic flux estimator 18, the inductance estimator 19 and the coil's resistance-value estimator 17 are corrected or modified on the basis of these constants having been stored in the memory unit. According to this arrangement, it is possible to curb reducing an estimation accuracy of a magnet temperature, due to variations in those motors, on an individual basis.

In addition, by estimating magnet's magnetic flux by the function $f_1$ having energizing currents as the parameters of the function and by magnet's no-load magnetic flux $\phi_{m0,n}$ being measured, memory can be reduced, and also it becomes possible to shorten the calculation time required for the temperature estimation. In a similar manner, by performing the estimation of inductances by the functions $f_2$ and $f_3$ each having the energizing currents as the parameters of the functions and by no-load inductance ($L_{d0,n}$, $L_{q0,n}$) being measured, similar effects can be obtained. As described above, evaluation expressions of $\phi_{m0}$, $L_d$, $L_q$ and $R_1$ being evaluation parameters in this case are given by the following Expressions (6) through Expression (9), respectively.

[Expression Figure-6]

$$\phi_{m0} = \phi_{m0,n} \times f_1(i_d, i_q) \tag{6}$$

[Expression Figure-7]

$$L_d = L_{d0,n} \times f_2(i_d, i_q) \tag{7}$$

[Expression Figure-8]

$$L_q = L_{q0,n} \times f_3(i_d, i_q) \tag{8}$$

Figure 9:
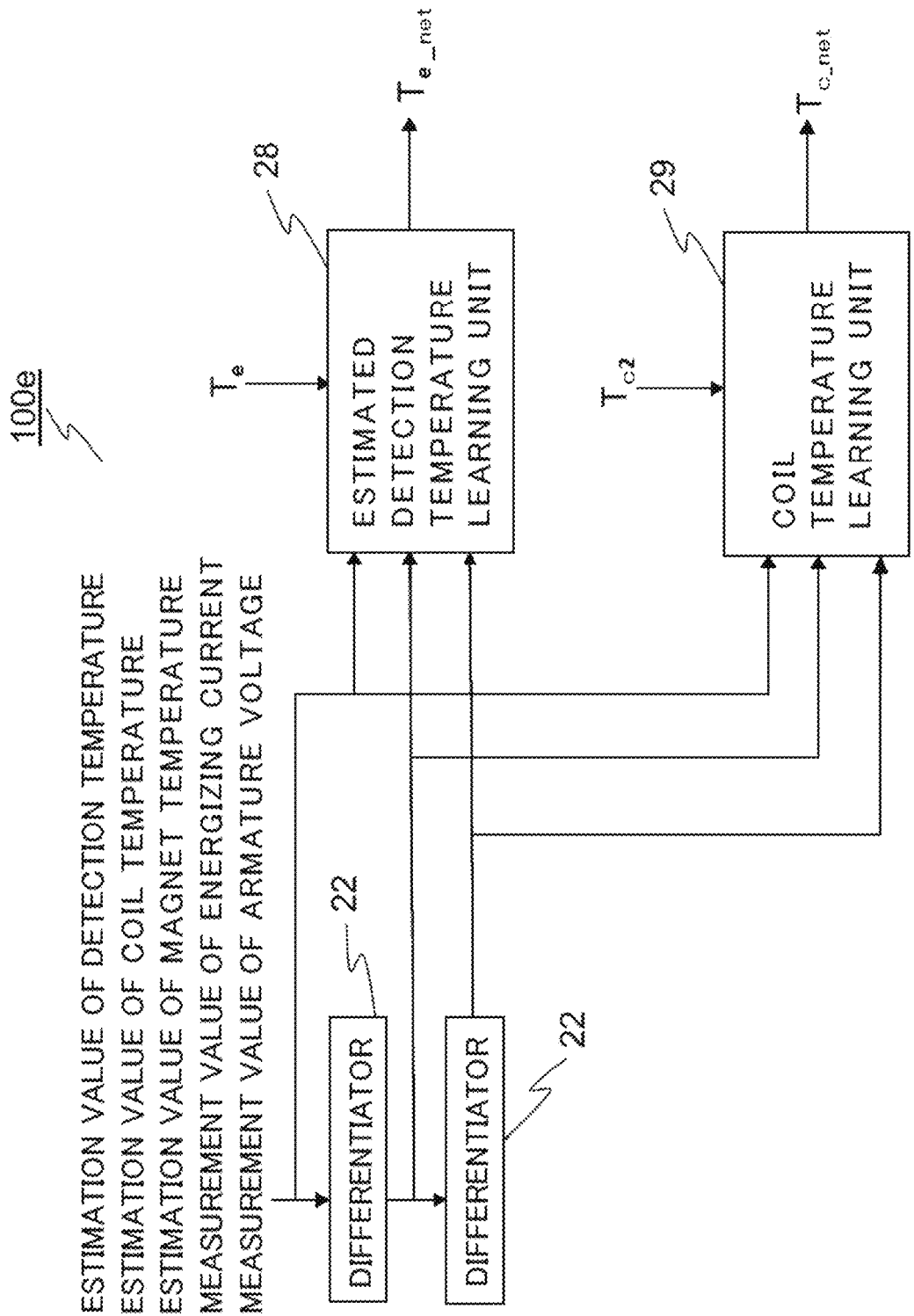
FIG. 9 is a block diagram of a first temperature estimation unit in a motor temperature and torque estimation device according to Embodiment 6.

[Expression Figure-9]

$$R_1 = \frac{1 + \alpha T_c}{1 + \alpha T_0} R_{0,n} \tag{9}$$

Because the motor temperature and torque estimation device according to Embodiment 5 is constituted as described above, it becomes possible to further enhance an estimation accuracy of a magnet's temperature and that of torque.

Embodiment 6

FIG. 9 is a block diagram of a temperature estimation unit in a motor temperature and torque estimation device 100e according to Embodiment 6. Comprised therein are an estimated detection temperature learning unit 28 for learning an estimated detection temperature by defining as "training data" the estimated detection temperature estimated from a detection temperature Te having been detected by a temperature sensor, and a coil temperature learning unit 29 for learning a second coil temperature $T_{c2}$ by defining as "training data" the coil temperature having been estimated on the basis of a voltage lower than that at a certain rotational speed $N_0$.

At this time, in the embodiment, a neural network is utilized as an estimation means. The neural network is of a neural network(s) in a general and hierarchical structure, and the neural network(s) is used in such a manner that the relationship between input values and output values is made learned in advance. As for training data to be made learned, used are pieces of data in which a "motor temperature and torque estimation device (s)" to be used is actually operated, and its measurement is then performed. That is to say, as for the training data, a temperature is either detected or estimated by means of a temperature sensor or a temperature estimator whose accuracy is obviously high, and then sets of pieces of temperature data (an estimation value of detection temperature, that of coil temperature, and that of magnet temperature; a measurement value of energizing current, and that of armature voltage; a first differential value of each estimation value, and that of each measurement value described above; and their second differential values of the same. Note that, these two kinds of differential values described above are acquired by the respective differentiators of FIG. 9) are formed. These pieces of data are formed in a plurality of sets, so that the learning of a neural network(s) is carried out by defining them as the training data.

The learning method utilizes "backpropagation" (Backpropagation; an error backpropagation method) which is generally used. When data is inputted into a neural network(s) which has already learned in such a manner described above, the neural network(s) outputs a detection temperature Te_net at that time and a coil temperature $T_{c2}$_net thereat.

Because the motor temperature and torque estimation device 100e according to Embodiment 6 is constituted as described above, it becomes possible to further enhance an estimation accuracy of a magnet's temperature and that of torque.

Figure 10:
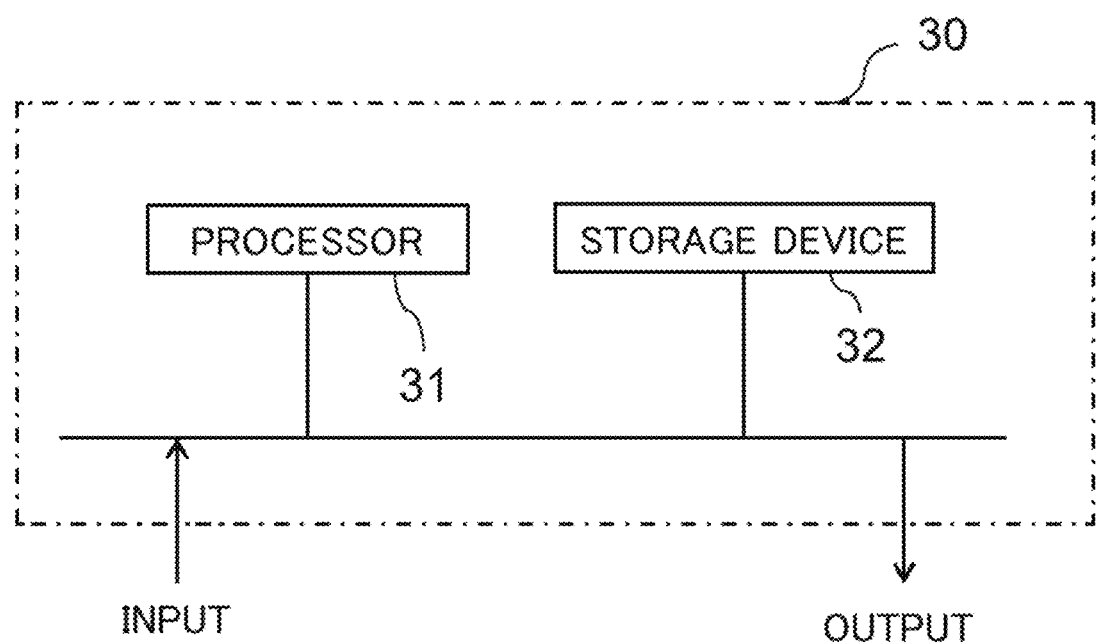
FIG. 10 is a diagram showing an example of respective constituent elements of signal processing related hardware in the motor temperature and torque estimation device according to Embodiments 1 through 6 each.

Shown in FIG. 10 is an example of signal processing related hardware 30 in respective constituent elements constituting the motor temperature and torque estimation devices each having been described above in the present disclosure in the application concerned. As shown in the figure, a processor 31 and a storage device 32 are included in the signal processing related hardware 30 of the estimation device. The storage device 32 is provided with a volatile storage device of a random access memory (RAM) or the like, and with a nonvolatile auxiliary storage device of a flash memory or the like, which are not shown in the figure. In addition, in place of the flash memory, an auxiliary storage device of a hard disk may be provided with. The processor 31 executes a program(s) inputted from the storage device 32. In this case, the program(s) is inputted into the processor 31 from the auxiliary storage device by way of the volatile storage device. Moreover, the processor 31 may output its data of a calculated result(s) or the like into the volatile storage device of the storage device 32, or may store the data into the auxiliary storage device by way of the volatile storage device.

Furthermore, a motor control device is manufactured in which any one of the motor temperature and torque estimation devices in Embodiment 1 through Embodiment 6 is built in, and a magnet temperature(s) of the motor and torque of the motor are estimated in good degrees of accuracy, whereby it becomes possible to achieve a motor which rotates in more stable and also more smooth conditions by means of the motor control device for controlling the rotation of the motor.

Note that, in the disclosure of the application concerned, various exemplary embodiments and implementation examples are described; however, various features, aspects and functions described in one or a plurality of embodiments are not necessarily limited to the applications of a specific embodiment(s), but are applicable in an embodiment(s) solely or in various combinations.

Therefore, limitless modification examples not being exemplified can be presumed without departing from the scope of the technologies disclosed in Description of the disclosure of the application concerned. For example, there arise cases which are included as a case in which at least one constituent element is modified, added or eliminated, and further a case in which at least one constituent element is extracted and then combined with a constituent element(s) of another embodiment.

EXPLANATION OF NUMERALS AND SYMBOLS

Numeral "1" designates a first temperature estimation unit; "1a," first coil temperature estimation unit; "2," second temperature estimation unit; "2a," second coil temperature estimation unit; "3," magnet's magnetic flux calculator; "4," magnet-temperature estimation unit; "5," magnet's magnetic flux estimation unit; "6," losses estimation unit; "7," torque estimation unit; "8," iron loss estimator; "9," mechanical loss estimator; "10," copper loss estimator; "11," temperature sensor; "12," first temperature estimator; "13," second temperature estimator; "14," "14a," third temperature estimator; "15," comparison-selection unit; "16," input-side terminal; "17," coil's resistance-value estimator; "18," magnet's magnetic flux estimator; "19," inductance estimator; "21," thermal demagnetization calculator; "22," differentiator; "23," coefficient-w setter; "24," resistance calculator; "25," coil temperature estimator; "26," coil temperature selector; "27," memory unit; "28," estimated detection temperature learning unit; "29," coil temperature learning unit; "30," signal processing related hardware; "31," processor; "32," storage device; and "100," "100a," "100b," "100c," "100d," "100e," motor temperature and torque estimation device;

What is claimed is:

1. A motor temperature and torque estimation device, comprising:
   a temperature sensor for detecting a temperature of an object to be measured;
   a losses estimation circuitry including an iron loss estimator, a mechanical loss estimator and a copper loss estimator to estimate an iron loss, a mechanical loss and a copper loss being respective losses of a motor, to estimate the iron loss, the mechanical loss and the copper loss, and outputting these losses each being estimated, when an electric current of the motor is energized;
   a first temperature estimation circuitry into which an output of the temperature sensor and outputs of the losses estimation circuitry are inputted, to estimate a first magnet temperature of the motor from losses of the motor estimated by the losses estimation circuitry and from a detection temperature of the object to be measured being detected by the temperature sensor, and to output a first magnet temperature of the motor being estimated;
   a second temperature estimation circuitry including a magnet's magnetic flux calculator thereinside to calculate magnet's magnetic flux of the motor on a basis of an energizing current of the motor, on that of an armature voltage thereof, on that of a coil resistance thereof and on that of inductance of the motor estimated in accordance with the energizing current, to estimate a second magnet temperature of the motor on a basis of magnet's magnetic flux of the motor obtained through a calculation and on that of magnet's magnetic flux estimated in accordance with the energizing current, and to output a second magnet temperature of the motor being estimated;
   a magnet-temperature estimation circuitry to estimate a magnet temperature of the motor from an output of the first temperature estimation circuitry and from an output of the second temperature estimation circuitry, and to output a magnet temperature of the motor being estimated;
   a magnet's magnetic flux estimation circuitry to estimate magnet's magnetic flux of the motor on a basis of magnet's magnetic flux estimated by the second temperature estimation circuitry in accordance with the energizing current, on that of a magnet temperature estimated by the magnet-temperature estimation circuitry and on that of a magnet's temperature characteristic, and also to output magnet's magnetic flux being estimated into the iron loss estimator; and
   a torque estimation circuitry into which an output of the magnet's magnetic flux estimation circuitry and outputs of the losses estimation circuitry are inputted, to estimate torque of the motor on a basis of magnet's magnetic flux estimated by the magnet's magnetic flux estimation circuitry, on that of the iron loss being estimated and on that of the mechanical loss being estimated, wherein
   a magnet temperature of the motor and torque of the motor are estimated.

2. The motor temperature and torque estimation device as set forth in claim 1, wherein
   the first temperature estimation circuitry includes:
      temperature estimators in three kinds, each of which is constituted of thermophysical property values as temperature estimator's parameters, which are a first temperature estimator to estimate from the detection temperature and from outputs of the losses estimation circuitry an estimated detection temperature and to output it, a second temperature estimator being connected to the first temperature estimator to estimate from the estimated detection temperature and from the outputs of the losses estimation circuitry a coil temperature of the motor and to output it, and a third temperature estimator being connected to the second temperature estimator to estimate from the coil temperature and from the outputs of the losses estimation circuitry a magnet temperature of the motor and to output it; and
      a comparison-selection circuitry to input into an input-side terminal of the first temperature estimator an output from a temperature estimator where, among the three kinds of temperature estimators, the detection temperature is compared with an output from the temperature estimators each being connected to the comparison-selection circuitry, and an output there-from is only selected when its difference to the detection temperature is at a smallest among the three kinds thereof.

3. The motor temperature and torque estimation device as set forth in claim 1, wherein
the second temperature estimation circuitry includes:
a magnet's magnetic flux estimator to estimate magnet's magnetic flux of the motor in accordance with an energizing current thereof;
an inductance estimator to estimate inductance of the motor in accordance with the energizing current therethrough;
a coil's resistance-value estimator, by applying thereto a coil temperature of the motor, to modify and to estimate a coil's resistance value thereof; and
a thermal demagnetization calculator, by applying thereto a temperature coefficient of a permanent magnet of the motor, to acquire a magnet temperature by calculating thermal demagnetization of magnet's magnetic flux, wherein
magnet's magnetic flux is acquired by inputting the coil's resistance value being estimated and inductance of the motor being estimated into the magnet's magnetic flux calculator, and also the second magnet temperature is estimated by calculating the thermal demagnetization by the thermal demagnetization calculator, on a basis of the magnet's magnetic flux being acquired and on that of magnet's magnetic flux being estimated by the magnet's magnetic flux estimator.

4. The motor temperature and torque estimation device as set forth in claim 2, wherein a temperature in which two first and second magnet temperatures estimated from the first temperature estimation circuitry and from the second temperature estimation circuitry are distributed on a proportional basis is determined as a magnet temperature of the motor being estimated by utilizing a weighting coefficient, being at zero or more but at one or less, defined in accordance with at least one weighting parameter in a total of twelve weighting parameters among an estimation error of a magnet temperature, an estimation error of a coil temperature, an estimation error of the estimated detection temperature, an energizing current of the motor, an armature voltage thereof and a rotational speed thereof, and rates of change in relation to these six kinds of respective values.

5. The motor temperature and torque estimation device as set forth in claim 2, wherein said thermophysical property value is corrected so that a difference between a first magnet temperature estimated by the first temperature estimation circuitry and a magnet temperature estimated by the magnet-temperature estimation circuitry becomes smaller than a value determined in advance.

6. The motor temperature and torque estimation device as set forth in claim 4, further comprising:
a second coil temperature estimation circuitry to estimate a second coil temperature on a basis of an armature voltage of the motor when a rotational speed of the motor is not more than a rotational speed thereof being set in advance, and individually to output a second coil temperature being estimated into the first temperature estimator, the second temperature estimator and another third temperature estimator;
a first coil temperature estimation circuitry to estimate a first coil temperature by modifying said thermophysical property value of the second temperature estimator in accordance with the estimated detection temperature and to output a first coil temperature being estimated, and also, when a rotational speed of the motor is not more than a rotational speed thereof being set in advance, to update said thermophysical property value provided with the first temperature estimator and/or that provided with the second temperature estimator so that a quantity of difference between the second coil temperature and the first coil temperature becomes smaller than a value defined in advance; and
the another third temperature estimator including a coil temperature selector which selects a coil temperature in accordance with a rotational speed of the motor in such a manner that the coil temperature selector selects the first coil temperature as the coil temperature when a rotational speed of the motor is higher than a rotational speed thereof being set in advance, and such a manner that the coil temperature selector selects the second coil temperature as the coil temperature when a rotational speed of the motor is not more than a rotational speed thereof being set in advance, wherein
the first magnet temperature is estimated by the another third temperature estimator on a basis of the first coil temperature, when a rotational speed of the motor is higher than a rotational speed thereof being set in advance; and
the first magnet temperature is estimated by the another third temperature estimator on a basis of the second coil temperature, when a rotational speed of the motor is not more than a rotational speed thereof being set in advance.

7. The motor temperature and torque estimation device as set forth in claim 6, wherein the second coil temperature estimation circuitry estimates the second coil temperature on a basis of a coil's resistance value estimated from an energizing current of the motor under a motor operation at a rotational speed of the motor not more than a rotational speed thereof being set in advance, from the armature voltage of the motor thereunder and from a coil resistance of the motor thereunder, on that of the coil resistance, and on that of a coil's resistance-value temperature coefficient.

8. The motor temperature and torque estimation device as set forth in claim 6, further comprising:
an estimated detection temperature learning circuitry, by defining as its training data the estimated detection temperature, to learn the estimated detection temperature; and
a coil temperature learning circuitry, by defining as its training data the second coil temperature estimated by the second coil temperature estimation circuitry, to learn the second coil temperature, and further comprising
another magnet-temperature estimation circuitry to estimate the magnet temperature based on the estimated detection temperature learning circuitry and on the coil temperature learning circuitry.

9. The motor temperature and torque estimation device as set forth in claim 4, further comprising:
a memory device, wherein
the memory device includes magnet's no-load magnetic flux, no-load inductance and a coil's resistance value as constants which are motor constants measured on a large number of motors in advance; and also wherein
said thermophysical property value is corrected in accordance with an energizing current of the motor on a basis of these motor constants, whereby a modification of magnet's magnetic flux of the motor, that of inductance thereof and that of a coil's resistance value thereof are performed.

10. A motor control device, comprising:
the motor temperature and torque estimation device as set forth in claim 1, wherein
rotation of a motor in the motor temperature and torque estimation device is controlled by estimating a magnet temperature of the motor and torque of the motor.

11. The motor temperature and torque estimation device as set forth in claim 4, wherein said thermophysical property value is corrected so that a difference between a first magnet temperature estimated by the first temperature estimation circuitry and a magnet temperature estimated by the magnet-temperature estimation circuitry becomes smaller than a value determined in advance.

12. The motor temperature and torque estimation device as set forth in claim 5, further comprising:
a second coil temperature estimation circuitry to estimate a second coil temperature on a basis of an armature voltage of the motor when a rotational speed of the motor is not more than a rotational speed thereof being set in advance, and individually to output a second coil temperature being estimated into the first temperature estimator, the second temperature estimator and another third temperature estimator;
a first coil temperature estimation circuitry to estimate a first coil temperature by modifying said thermophysical property value of the second temperature estimator in accordance with the estimated detection temperature and to output a first coil temperature being estimated, and also, when a rotational speed of the motor is not more than a rotational speed thereof being set in advance, to update said thermophysical property value provided with the first temperature estimator and/or that provided with the second temperature estimator so that a quantity of difference between the second coil temperature and the first coil temperature becomes smaller than a value defined in advance; and
the another third temperature estimator including a coil temperature selector which selects a coil temperature in accordance with a rotational speed of the motor in such a manner that the coil temperature selector selects the first coil temperature as the coil temperature when a rotational speed of the motor is higher than a rotational speed thereof being set in advance, and such a manner that the coil temperature selector selects the second coil temperature as the coil temperature when a rotational speed of the motor is not more than a rotational speed thereof being set in advance, wherein
the first magnet temperature is estimated by the another third temperature estimator on a basis of the first coil temperature, when a rotational speed of the motor is higher than a rotational speed thereof being set in advance; and
the first magnet temperature is estimated by the another third temperature estimator on a basis of the second coil temperature, when a rotational speed of the motor is not more than a rotational speed thereof being set in advance.

13. The motor temperature and torque estimation device as set forth in claim 11, further comprising:
a second coil temperature estimation circuitry to estimate a second coil temperature on a basis of an armature voltage of the motor when a rotational speed of the motor is not more than a rotational speed thereof being set in advance, and individually to output a second coil temperature being estimated into the first temperature estimator, the second temperature estimator and another third temperature estimator;
a first coil temperature estimation circuitry to estimate a first coil temperature by modifying said thermophysical property value of the second temperature estimator in accordance with the estimated detection temperature and to output a first coil temperature being estimated, and also, when a rotational speed of the motor is not more than a rotational speed thereof being set in advance, to update said thermophysical property value provided with the first temperature estimator and/or that provided with the second temperature estimator so that a quantity of difference between the second coil temperature and the first coil temperature becomes smaller than a value defined in advance; and
the another third temperature estimator including a coil temperature selector which selects a coil temperature in accordance with a rotational speed of the motor in such a manner that the coil temperature selector selects the first coil temperature as the coil temperature when a rotational speed of the motor is higher than a rotational speed thereof being set in advance, and such a manner that the coil temperature selector selects the second coil temperature as the coil temperature when a rotational speed of the motor is not more than a rotational speed thereof being set in advance, wherein
the first magnet temperature is estimated by the another third temperature estimator on a basis of the first coil temperature, when a rotational speed of the motor is higher than a rotational speed thereof being set in advance; and
the first magnet temperature is estimated by the another third temperature estimator on a basis of the second coil temperature, when a rotational speed of the motor is not more than a rotational speed thereof being set in advance.

14. The motor temperature and torque estimation device as set forth in claim 5, wherein the second coil temperature estimation circuitry estimates the second coil temperature on a basis of a coil's resistance value estimated from an energizing current of the motor under a motor operation at a rotational speed of the motor not more than a rotational speed thereof being set in advance, from the armature voltage of the motor thereunder and from a coil resistance of the motor thereunder, on that of the coil resistance, and on that of a coil's resistance-value temperature coefficient.

15. The motor temperature and torque estimation device as set forth in claim 11, wherein the second coil temperature estimation circuitry estimates the second coil temperature on a basis of a coil's resistance value estimated from an energizing current of the motor under a motor operation at a rotational speed of the motor not more than a rotational speed thereof being set in advance, from the armature voltage of the motor thereunder and from a coil resistance of the motor thereunder, on that of the coil resistance, and on that of a coil's resistance-value temperature coefficient.

16. The motor temperature and torque estimation device as set forth in claim 12, further comprising:
an estimated detection temperature learning circuitry, by defining as its training data the estimated detection temperature, to learn the estimated detection temperature; and
a coil temperature learning circuitry, by defining as its training data the second coil temperature estimated by the second coil temperature estimation circuitry, to learn the second coil temperature, and further comprising another magnet-temperature estimation circuitry to estimate the magnet temperature based on the estimated detection temperature learning circuitry and on the coil temperature learning circuitry.

17. The motor temperature and torque estimation device as set forth in claim 13, further comprising:

an estimated detection temperature learning circuitry, by defining as its training data the estimated detection temperature, to learn the estimated detection temperature; and a coil temperature learning circuitry, by defining as its training data the second coil temperature estimated by the second coil temperature estimation circuitry, to learn the second coil temperature, and further comprising another magnet-temperature estimation circuitry to estimate the magnet temperature based on the estimated detection temperature learning circuitry and on the coil temperature learning circuitry.

18. The motor temperature and torque estimation device as set forth in claim 14, further comprising:

an estimated detection temperature learning circuitry, by defining as its training data the estimated detection temperature, to learn the estimated detection temperature; and a coil temperature learning circuitry, by defining as its training data the second coil temperature estimated by the second coil temperature estimation circuitry, to learn the second coil temperature, and further comprising another magnet-temperature estimation circuitry to estimate the magnet temperature based on the estimated detection temperature learning circuitry and on the coil temperature learning circuitry.

19. The motor temperature and torque estimation device as set forth in claim 15, further comprising:

an estimated detection temperature learning circuitry, by defining as its training data the estimated detection temperature, to learn the estimated detection temperature; and a coil temperature learning circuitry, by defining as its training data the second coil temperature estimated by the second coil temperature estimation circuitry, to learn the second coil temperature, and further comprising another magnet-temperature estimation circuitry to estimate the magnet temperature based on the estimated detection temperature learning circuitry and on the coil temperature learning circuitry.

20. The motor temperature and torque estimation device as set forth in claim 5, further comprising:

a memory device, wherein the memory device includes magnet's no-load magnetic flux, no-load inductance and a coil's resistance value as constants which are motor constants measured on a large number of motors in advance; and also wherein said thermophysical property value is corrected in accordance with an energizing current of the motor on a basis of these motor constants, whereby a modification of magnet's magnetic flux of the motor, that of inductance thereof and that of a coil's resistance value thereof are performed.

* * * * *